United States Patent
Zvonar

(10) Patent No.: US 6,205,409 B1
(45) Date of Patent: Mar. 20, 2001

(54) PREDICTIVE FAILURE MONITORING SYSTEM FOR A MASS FLOW CONTROLLER

(75) Inventor: John G. Zvonar, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/105,282

(22) Filed: Jun. 26, 1998

(51) Int. Cl.[7] .................................................. G01F 25/00
(52) U.S. Cl. ........................ 702/183; 702/100; 700/282; 700/266; 137/486
(58) Field of Search .................................... 702/183, 100, 702/45; 73/204.15, 1.16; 137/2, 486; 700/282, 266

(56) References Cited

U.S. PATENT DOCUMENTS 5,865,205 * 2/1999 Wilmer ....................................... 137/2
6,062,246 * 5/2000 Tanaka et al. ........................... 137/12

OTHER PUBLICATIONS

Tylan General, Inc., Data sheets for FC–2950M/FM–3950M Mass Flow Controller, 2 pages, May 1993.
"Providing A New Dimension of Service," Coastal Instruments Tutorial, Jun. 1997.

* cited by examiner

Primary Examiner—Kamini Shah
(74) Attorney, Agent, or Firm—Skjerven Morrill MacPherson, LLP; Stephen A. Terrile

(57) ABSTRACT

By monitoring the output voltage of a mass flow controller (MFC) there is no way to detect when a MFC is starting to degrade (or beginning to fail) as long as the MFC output voltage is driven to match the MFC setpoint voltage. Only when the MFC actually fails, and the MFC output voltage is unable to be driven to match the MFC setpoint voltage, is the failure detectable. A predictive failure monitoring system for a mass flow controller (MFC) is disclosed which monitors the "valve voltage" of the MFC as well as the MFC output voltage. By knowing the normal relationship between the MFC setpoint voltage and the respective valve voltage, then degradation or other changes may be noticed before the MFC actually fails, and importantly, before production material is ruined by the failing MFC. Such a real-time monitoring capability may be transparently implemented as an add-on module between the MFC and the system controller for the MFC. The add-on module may be advantageously connected between the MFC card edge connector and the system card edge socket which is normally connected to the MFC card edge connector. The module monitors, in real time, the performance of the MFC by measuring the valve voltage on the valve test point. If determined to be outside of various user-settable limits, then warnings and relay closures may be done. The module can also automatically characterize the MFC operation when known to be proper, then go into a "run" mode to monitor operation and provide indications when operation falls outside of user-settable limits.

26 Claims, 14 Drawing Sheets

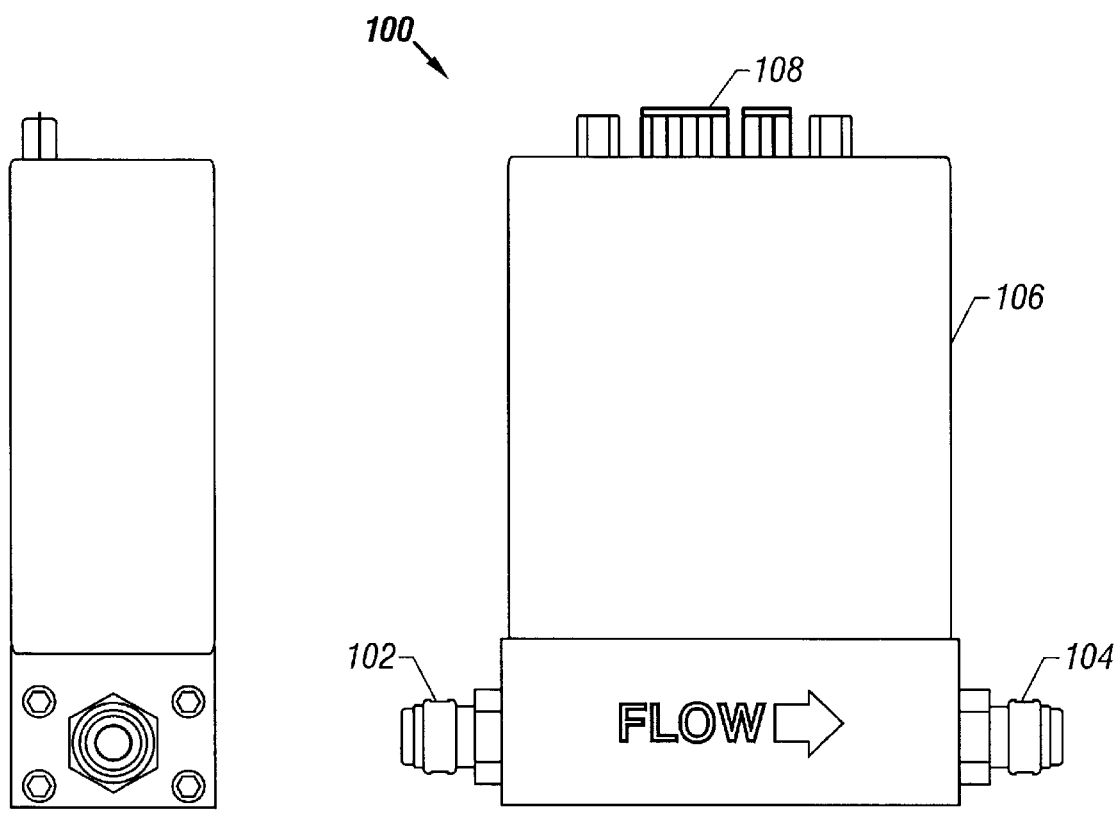
FIG. 1A
*(Prior Art)*
FIG. 1B
*(Prior Art)*
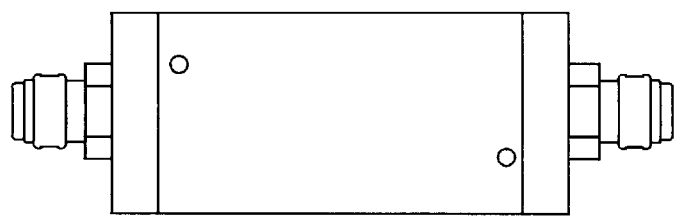
FIG. 1C
*(Prior Art)*

V = THIS IS THE ABSOLUTE VALUE OF THE CURRENT VALVE VOLTAGE

M = THIS IS THE ABSOLUTE VALUE OF THE MODEL VALVE VOLTAGE

S = THIS IS THE VALUE OF THE <u>MONITORED</u> SETPOINT

% = THIS IS THE PERCENT DIFFERENCE AS $\frac{(V-M)}{M} = 100$

PREDICTIVE FAILURE MONITORING SYSTEM FOR A MASS FLOW CONTROLLER

BACKGROUND OF THE INVENTION

Mass Flow Controllers (MFC) are used extensively in modern semiconductor manufacturing to control the flow of various gases into a wide variety of process equipment, such as etchers, deposition reactors, implanters, etc. Many individual pieces of equipment have more than one such MFC, with six to eight MFCs per major piece of semiconductor manufacturing equipment not being uncommon.

A representative MFC 100 is shown in three orthogonal views in FIGS. 1A, 1B, and 1C. A source of gas is connected to and received at an input port 102 and a controlled flow is delivered to an output port 104 and to downstream equipment attached thereto. A housing 106 contains an electronic module for controlling the MFC which is connected to a system controller (not shown) by way of a cable attached to an MFC card edge connector 108.

To more fully appreciate the invention, a brief description of the inner workings of a typical MFC is warranted. Referring now to FIG. 2, the representative MFC 100 includes four distinct subsystems. A mass flow sensor 120 produces an electrical signal proportional to the mass of the gas flowing therethrough. A control valve 122 acts as a variable orifice to control the total gas flowing through the MFC 100. A flow bypass 124 diverts a small portion of the total gas flowing into the MFC 100 into and through the mass flow sensor 120. Lastly, a printed wiring board 126 contains various circuits for controlling the MFC 100, and typically include a sensor bridge and amplifier circuit, a control circuit, and an RC network, as described more fully below.

Referring now to FIG. 3, the basic operation of the MFC 100 is described. The mass flow sensor 120 is illustrated as a "capillary tube" thermal mass flow sensor which is designed to measure the mass of gas flowing through a thin stainless steel capillary sensor tube 131. Two temperature sensing wire windings 130, 132 are attached around the sensor tube 131. One winding is located on the upstream side of the sensor tube 131 and the other winding is located on the downstream side of the sensor tube 131. The wire forming these windings 130, 132 is resistance thermal detection (RTD) type wire, which means the resistance of such wire is a function of the temperature of the wire. The sensor tube is installed in a protective cover and is usually enclosed in heat insulating material. An equal amount of heat is produced in both sensor windings either directly by a constant current source or by using a separate heater wire winding (not shown) between the upstream sensor winding 130 and the downstream sensor winding 132.

With no gas flowing through the sensor 120, both the upstream sensor winding 130 and the downstream sensor winding 132 are at the same temperature, and consequently, they both have the same resistance. Since each winding 130, 132 has the same resistance, and the same current flows through each winding, the voltage drop across each winding 130, 132 is the same. The voltage drop across each winding 130, 132 is compared by a sensor bridge and amplifier circuit 134 to produce an MFC output voltage conveyed on sensor output terminal 140.

With 50% gas flow through the mass flow sensor 120, gas at room temperature flows through the sensor tube 131 and heat from the upstream sensor winding 130 is transferred to the gas molecules. This reduces the temperature of the upstream sensor winding 130, and increases the temperature of the gas. As this hotter gas flows past the downstream sensor winding 132 it transfers less heat away from the downstream sensor winding 132. This difference in temperature between the upstream sensor winding 130 and the downstream sensor winding 132 results in a difference in resistance between the two windings 130, 132, which then results in a difference in voltage across the two windings 130, 132. This voltage difference is amplified and linearized by sensor bridge and amplifier circuit 134 to become the MFC output voltage at sensor output terminal 140. This output voltage is an indirect result of gas molecules flowing through the mass flow sensor 120.

In other words, the difference in temperature between the upstream sensor winding 130 and the downstream sensor winding 132 is sensed as a small (millivolts) non-zero voltage by the sensor bridge and amplifier circuit 134. This small voltage is amplified to a typical level of several volts and linearized to provide a 0 to 5 volt DC output voltage signal (for many commercial MFCs) which is proportional to the mass of the gas flowing through the mass flow sensor 120. If the ratio of gas flowing through the mass flow sensor 120 and through the flow bypass 124 is correct, the output signal is proportional to the mass of the gas flowing through the MFC 100 from the input port 102 to the output port 104.

A control circuit 136 compares the output voltage signal produced by the sensor bridge and amplifier circuit 134 against an externally supplied setpoint signal conveyed on terminal 142. The setpoint signal is usually a 0 to 5 volt DC signal and corresponds to the actual flow desired through the MFC. The control circuit 136 drives a valve control transistor 138 which positions the control valve 122 in such a manner as to eliminate any difference between the setpoint signal and the output signal. If the actual flow (represented by the MFC output voltage) is less than the desired flow (as represented by the MFC setpoint voltage), the control circuit 136 biases the valve control transistor 138 in such a manner as to open the control valve 122 to allow more gas flow through the control valve 122, and hence through the MFC 100. As more gas flows through the MFC 100, proportionally more gas flows through the mass flow sensor 120 causing the MFC output voltage to increase. This reduces the difference between the MFC setpoint voltage and the MFC output voltage.

The electrical schematic diagram of a particular manufacturer's MFC is shown in FIG. 4. Shown is the schematic for a model FC-2950M mass flow controller/flowmeter available from Tylan General, Inc., located in San Diego and Torrance, Calif. The upstream sensor winding 130 and downstream sensor winding 132 are shown as resistors which connect into a bridge circuit 154, the outputs of which are then amplified by an amplifier 156 to produce the MFC output voltage at terminal 140. Various RC feedback circuitry within the amplifier 156 serve to stabilize the operation of the amplifier 156. The bridge circuit 154, amplifier 156, and other feedback and reference circuits shown form the sensor bridge and amplifier circuit 134 described previously. The control circuit 136 receives the MFC output voltage and compares it to the MFC setpoint voltage on terminal 142 to control the valve control transistor 138, whose output terminal 150 is connected to the control valve 122 (modeled on the schematic as a resistor connected to terminals V1 and V2) through a current-limiting resistor 158. Each of the signals shown on the left side of FIG. 4 are usually available at the MFC card edge connector 108.

As described above, the closed-loop feedback operation of the control circuit 136 causes the MFC output voltage on terminal 140 to be driven to match the MFC setpoint voltage on terminal 142. The "valve voltage" on terminal 150 is adjusted to whatever voltage is required to adjust the gas flow in order to cause the MFC output voltage to match the MFC setpoint voltage. A system controller which is connected to the MFC card edge connector 108 presents to the MFC 100 the desired MFC setpoint voltage, and then monitors the MFC output voltage produced by the MFC 100 in response thereto.

SUMMARY OF THE INVENTION

The closed loop nature of the MFC 100 results in the MFC output voltage always matching, if at all possible, the MFC setpoint voltage. Unfortunately, subtle changes in the MFC, or in the system around the MFC, are undetectable by the system controller. For example, if the control valve 122 ages and requires a higher voltage to allow a certain amount of gas flow than it previously required, the system controller is unable to notice this degradation in the MFC. Similarly, if a stoppage forms in the piping downstream of the MFC, and the control valve 122 must open a little more to allow a certain gas flow than without the stoppage, the system controller is unable to notice this degradation in the system.

By monitoring the MFC output voltage there is no way to detect when a MFC is starting to degrade (or beginning to fail) as long as the MFC output voltage is driven to match the MFC setpoint voltage. Only when the MFC actually fails, and the MFC output voltage is unable to be driven to match the MFC setpoint voltage, is the failure detectable. However, by monitoring the "valve voltage" (e.g., the actual voltage across the control valve 122, or equivalently a voltage on a node such as node 150 in FIG. 4 which is proportional to the actual valve voltage, or even a current which is representative of the control valve operation) and not just monitoring the MFC output voltage, and by knowing the normal relationship between the MFC setpoint voltage and the respective valve voltage, then degradation or other changes may be noticed before the MFC actually fails, and importantly, before production material is ruined by the failing MFC.

Such a real-time monitoring capability may be transparently implemented using an add-on module between the MFC and the system controller. More specifically, the add-on module may be connected between the MFC card edge connector 108 and the system card edge socket which is normally connected to the MFC card edge connector 108. The module monitors, in real time, the performance of the MFC. If the MFC performance is outside of user limits, various warnings and relay closures may be done. The module can also automatically characterize the MFC operation, then go into a warning/watch mode. The module can monitor the MFC valve voltage on the valve test point, and optionally can also send data to a host computer.

This module monitors a closed loop system which heretofore gave no warning of degradation or impending failure. It also eliminates the need for preventive maintenance (PM) which pulls the MFC to check calibration, eliminates scrap wafers due to MFC drift or failure, except in the catastrophic failure mode.

BRIEF DESCRIPTION OF THE DRAWINGS

The present invention may be better understood, and its numerous objects, features, and advantages made apparent to those skilled in the art by referencing the accompanying drawings.

FIGS. 1A, 1B, and 1C, labeled prior art, are orthogonal views of a mass flow controller typically used within the semiconductor industry.

The use of the same reference symbols in different drawings indicates similar or identical items.

DETAILED DESCRIPTION

Figure 2:
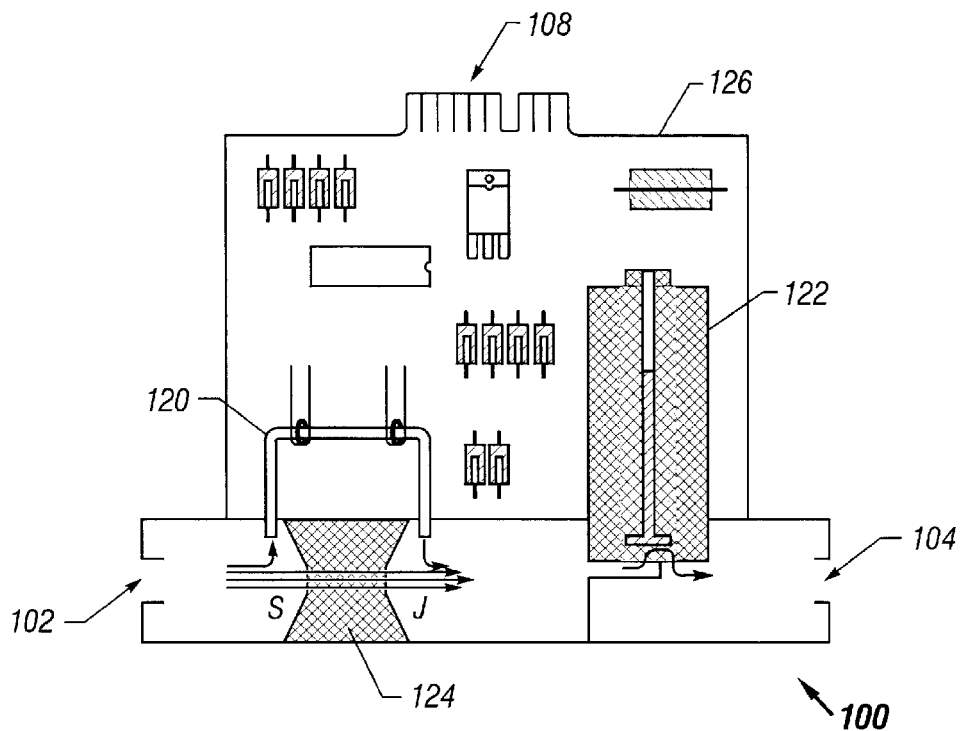
FIG. 2, labeled prior art, is a two-dimensional drawing depicting the major physical components of a mass flow controller.
Figure 3:
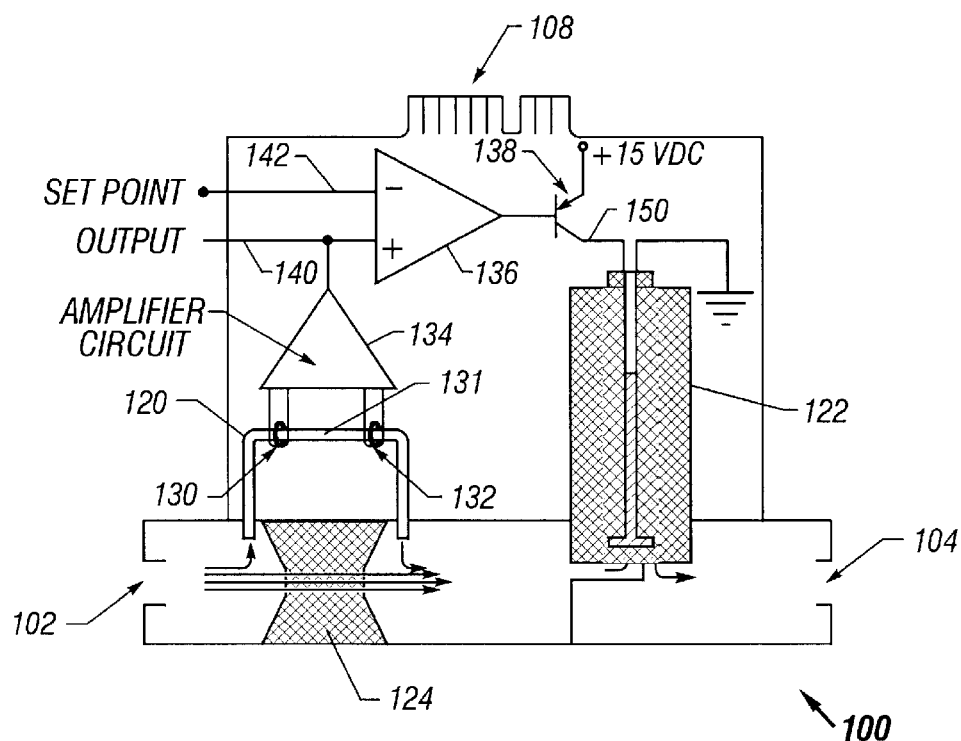
FIG. 3, labeled prior art, is a two-dimensional drawing depicting the major electrical components of a mass flow controller.
Figure 4:
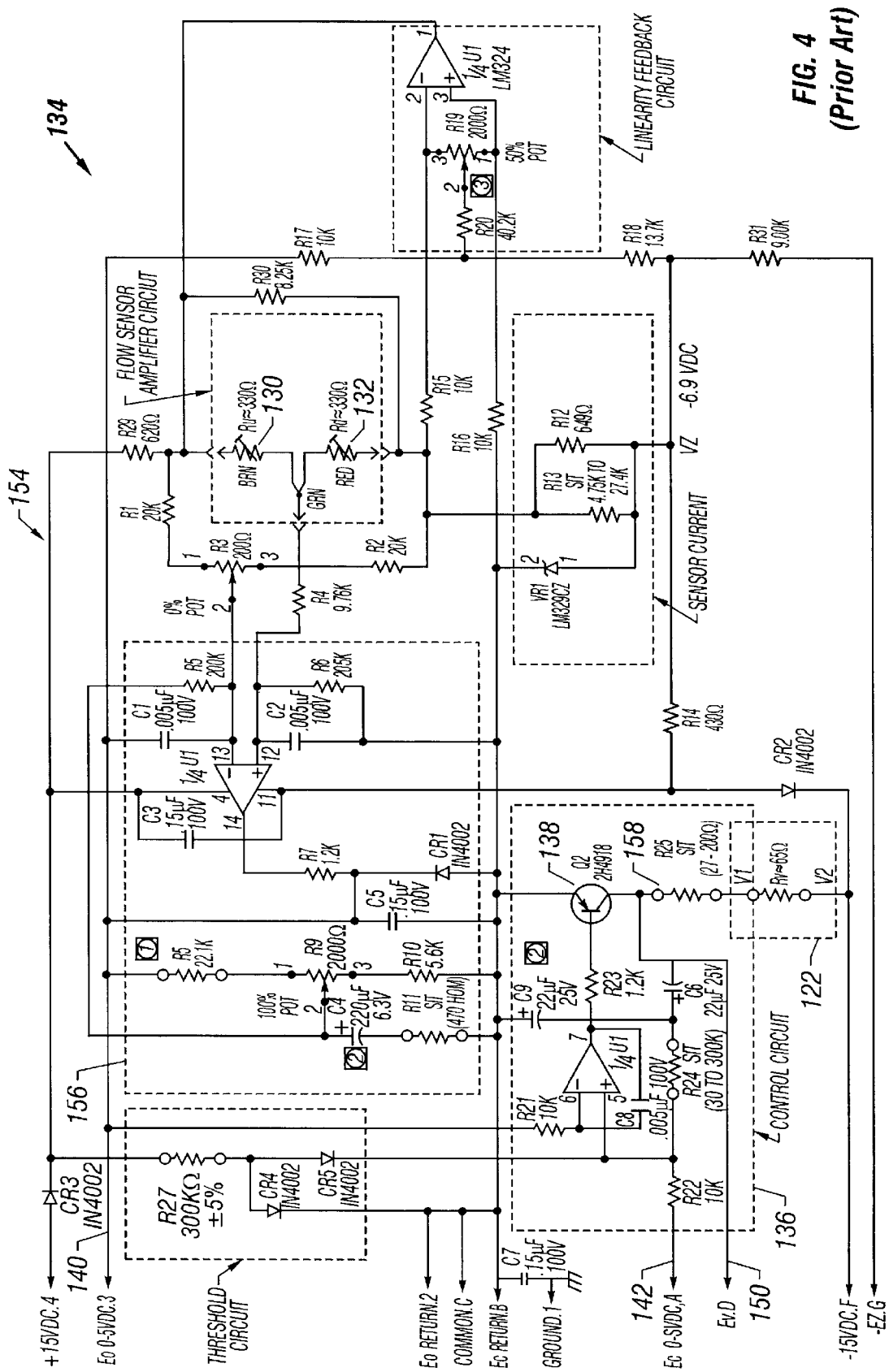
FIG. 4, labeled prior art, is an electrical schematic of a representative mass flow controller which is generally available.
Figure 5:
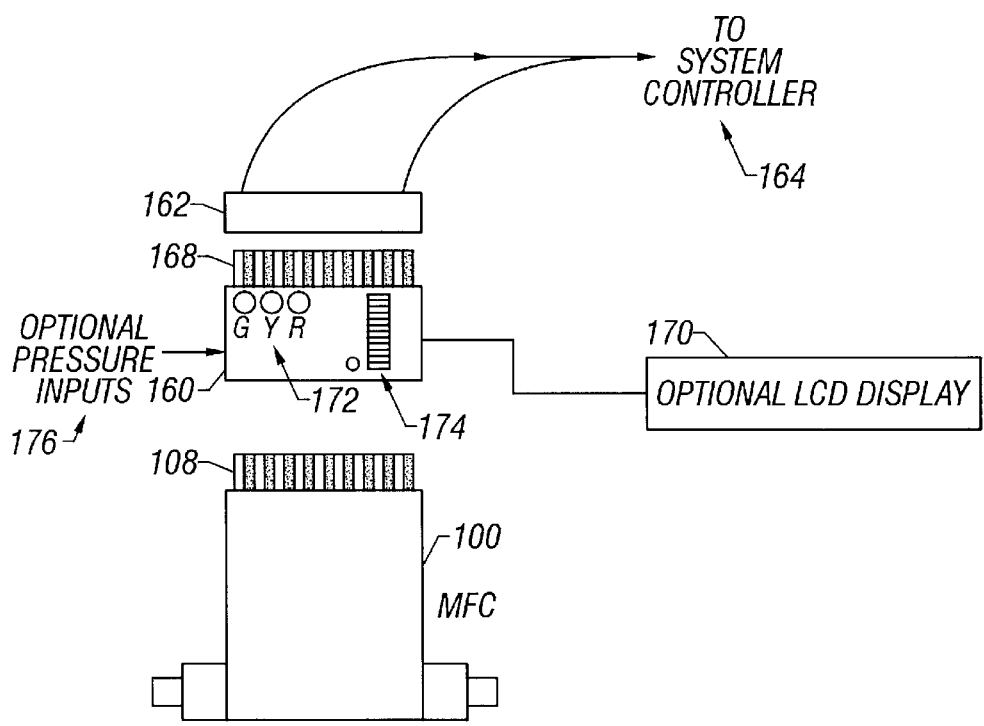
FIG. 5 is a diagram indicating a predictive failure monitoring system, in accordance with one embodiment of the present invention, and particularly indicating the manner of its connection between a mass flow controller and a system controller which is otherwise normally connected to the MFC.

FIG. 5 depicts the connection of a predictive failure monitoring system 160 (PFMS 160), in accordance with one embodiment of the present invention, between a mass flow controller 100 and a system controller 164. Normally, signals are communicated to and from the system controller 164 by way of a system card edge socket 162, which is normally connected to the MFC card edge connector 108. Here, the predictive failure monitoring system 160 is connected to the MFC card edge connector 108, and the system card edge socket 162 is connected to a monitor card edge connector 168. In normal operation all electrical signals on the MFC card edge connector 108 are passed straight-through to the monitor card edge connector 168, so that the predictive failure monitoring system 160 may exist transparently in the total system, without requiring any software or controller changes to be made. Moreover, no cabling changes are required, as even power is supplied to the predictive failure monitoring system 160 by the system controller 164. User-controlled switches 174 (e.g., DIP switches) provide for configuration of the predictive failure monitoring system 160 and a variety of status lights 172 allow an operator to perceive its operational status. An optional LCD display 170 may also be connected to provide user feedback of the operational status of the monitoring system 160. Moreover, optional pressure inputs 176 afford the capability of monitoring the upstream and/or downstream pressure along with the MFC setpoint voltage and MFC output voltage. Both the upstream and downstream pressures may be monitored, or alternatively the pressure differential across the MFC may be monitored. Optional switch closure output terminals (not shown) provide for a series alarm loop through multiple devices, where an alarm condition within any one device breaks the circuit and triggers a system alarm. These and other capabilities are described in greater detail below.

Figure 6:
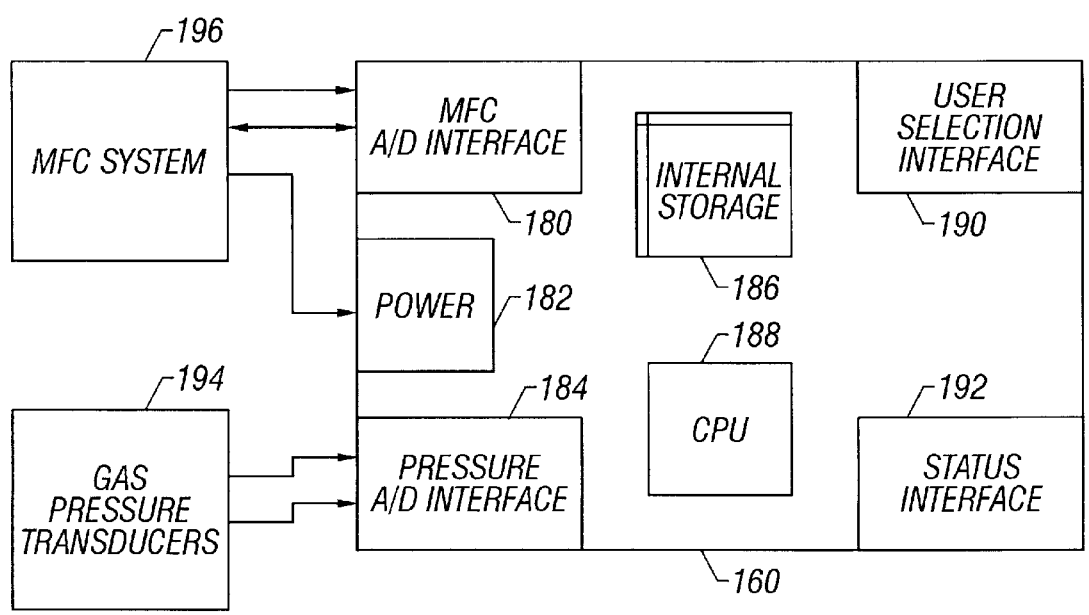
FIG. 6 is a block diagram indicating the major components of the predictive failure monitoring system shown in FIG. 5.

Referring now to FIG. 6, the major components of the predictive failure monitoring system 160 include a CPU 188, internal storage 186, user selection interface 190, status interface 192, MFC A/D interface 180, power interface 182, and pressure A/D interface 184. The monitoring of the MFC 100 is performed by measuring the MFC setpoint voltage and internal valve voltage at a point in time, and comparing them against the respective values of these two parameters when performance was known to be good. The internal storage 186 serves to store the reference values of the MFC setpoint voltage and the corresponding internal valve voltage when performance of the MFC is known to be good. The CPU 188 performs necessary sequencing and control of the predictive failure monitoring system 160. The internal storage 186 and CPU 188 may be advantageously implemented, for example, using a flash $E^2$PROM microcontroller, such as is available from the Microchip Corporation of Phoenix, Ariz. The user selection interface 190 receives configuration inputs from a user (by way of, for example, switches or a computer interface), as described below. The status interface 192 provides (by way of, for example, display lights, a computer interface, or an attached LCD display 170) status information about the attached MFC. The MFC A/D interface 180 connects to various signals passing between the system controller 164 and the MFC 100, digitizes certain ones, particularly the MFC setpoint voltage and the valve voltage, and provides the digitized values to the CPU 188. Power from the system controller 164 is received into the power interface 182 and provided to other portions of the predictive failure monitoring system 160. Lastly, signals from optional external pressure transducers (indicated as gas pressure transducers 194) are received by pressure A/D interface 184, digitized, and provided to the CPU 188.

The monitoring of the MFC 100 is performed by measuring the MFC setpoint voltage and internal valve voltage at a point in time, and comparing them against the respective values of these two parameters when performance was known to be good. If the measured valve voltage for a given MFC setpoint voltage no longer holds within predetermined limits of the reference value of the valve voltage, various actions can occur, including generating an alarm. Optionally, the reference relationship may include both upstream and downstream gas pressure measurements. The reference relationship may be table-based, where the table may be loaded into internal storage 186 in any of several ways, including an automatic characterization ("learn mode") of the attached MFC, or an automatic statistical storing of actual MFC setpoint voltages used by the system controller 164 and the resulting valve voltages generated by the MFC 100. Moreover, the reference relationship may be equation based, all as described more fully below.

In all these operating modes, the basic operation of the predictive failure monitoring system 160 may be described as follows. Measurements are performed at a usually regular interval such as, for example, every 16 ms. For each measurement of the MFC setpoint voltage, the nominal expected value of the valve voltage (i.e., the "model" value) is determined either by indexing into a table (stored, typically, in internal storage 186) or by computation using a characterization equation for the particular MFC. The measured valve voltage is then compared against a user-settable tolerance window centered around the nominal expected valve voltage just determined. If the measured valve voltage falls outside the tolerance window, then an "OUT" counter is incremented. If the next measurement is determined to also fall outside the tolerance window, then the OUT counter is incremented again. The OUT counter will continue to increment if each consecutive sample (or measurement) falls outside the tolerance window. However, if a sample finds the measured value of valve voltage within the tolerance window, then the OUT counter is reset and an IN counter is incremented. Subsequent measurements within the tolerance window increment the IN counter. In this way, momentary measurements which fall outside of the tolerance window may be ignored, while only continued out-of-tolerance conditions advance the status of the predictive failure monitoring system 160 to more urgent status levels.

In the exemplary embodiment of the predictive failure monitoring system 160 which is shown, four user-selectable tolerance settings are provided. For each setting, a CONTROL limit and an ALARM limit are specified. A warning is typically generated by the predictive failure monitoring system 160 if operation of the MFC 100 falls outside of a CONTROL tolerance window, while an alarm condition is typically generated if operation of the MFC 100 falls outside of an ALARM tolerance window. The four exemplary tolerance settings are set forth in Table 1 and are selectable by the user, by way of switches, a computer interface, or other suitable manner.

TABLE 1

| Control | Alarm |
| --- | --- |
| ±2% | ±5% |
| ±5% | ±10% |
| ±5% | ±15% |
| ±10% | ±20% |

A visual indication of the operation of the attached MFC is provided by a group of operational status lights 172 which include, for example, a green, a yellow, and a red light. The green light is illuminated when measured operation of the MFC 100 is within the CONTROL tolerance window (i.e., "within CONTROL limits"). The yellow light is illuminated when measured operation of the MFC 100 is outside the CONTROL tolerance window but is within the ALARM tolerance window (i.e., "within ALARM limits"). Lastly, the red light is illuminated when measured operation of the MFC 100 is outside the ALARM tolerance window. These status lights 172 are all provided within the status interface 192. Moreover, a dry contact switch is also provided by status interface 192 for integration into an alarm loop. The switch is closed when alarm limits are exceeded for the requisite number of consecutive samples.

A predetermined number of consecutive samples must all be outside the CONTROL limits for the status of the monitoring system 160 to transition from "green" to "yellow" status. This number of consecutive samples is user-selectable. Likewise, the same user-selectable number of consecutive samples must be outside the ALARM limits for the status of the monitoring system 160 to transition to "red" status. If, at any time, a given number of consecutive samples are within a particular tolerance window, the status advances to correspond to that tolerance window. For example, if the predictive failure monitoring system 160 currently indicates an alarm condition (e.g., a "red" status), a user-selectable number of samples falling within the ALARM limits causes the status to advance from "red" to "yellow." Similarly, the same user-selectable number of samples falling within the CONTROL limits causes the status to advance to "green." Four different user-selectable delay/sample sizes are provided in the exemplary embodiment, as summarized in Table 2 below.

TABLE 2

| OUT Samples | IN Samples |
|---|---|
| 2 | 1 = 16 ms |
| 4 | 2 = 32 ms |
| 16 | 8 = .125 s |
| 32 | 16 = .25 s |

A particular advantage of the exemplary monitoring system 160 is its transparent monitoring of an attached MFC. No changes in the system controller are required, for the predictive failure monitoring system 160 resides between the system controller 164 and the MFC 100. All signals on the MFC card edge connector 108 (with one exception to be described below) are passed through without change to the monitor card edge connector 168. This allows the predictive failure monitoring system 160 to be directly plugged into an existing system. Some MFC systems can use the existing valve test point to measure the valve voltage signal, while others will require the valve voltage signal to be brought to and connected to the MFC card edge connector 108.

Characterization of an attached MFC may be performed during MFC calibration and a resulting equation embedded into the operating code of the predictive failure monitoring system 160. Rather than equation based, the predictive failure monitoring system 160 may also be table-based. Characterization can be performed in-situ (i.e., the "learn mode") by collecting a spread of actual measured data into an internal table for later use in monitoring. Alternatively, characterization can be performed ad hoc by collecting only MFC setpoint voltage data used by the system controller 164 and measuring the resulting valve voltage (i.e., the "watch mode"). In either mode, the table of data may be dumped under user control to a host computer or other suitable controller. Each of these operating modes is described in greater detail below.

Figure 7:
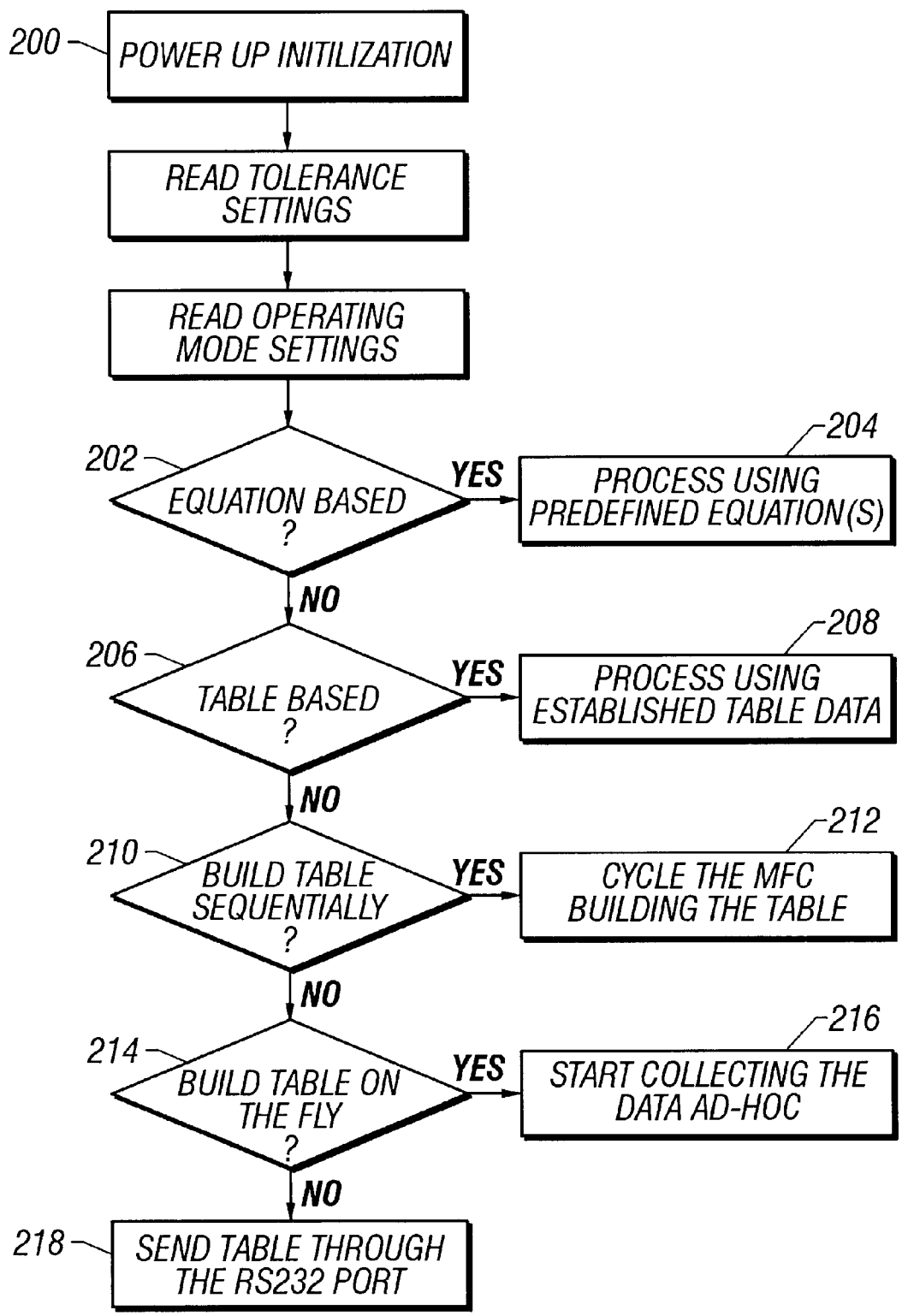
FIG. 7 is a flowchart depicting the major operating blocks of the exemplary predictive failure monitoring system.

Referring now to FIG. 7, the major operating blocks of the predictive failure monitoring system 160 are described in flowchart form. After power-up initialization at block 200, the tolerance settings and the operating mode settings are read. If operation is to be equation based, flow passes from block 202 to block 204 and the predictive failure monitoring system 160 operates using predefined equations (one of two "run" modes). If operation is to be table-based, flow passes from block 206 to block 208 and the predictive failure monitoring system 160 operates using established table data previously loaded into the internal storage 186 (the second of the two "run" modes). However, if the table is to be built sequentially, control passes from block 210 to block 212 and the MFC is cycled to build the table. Control passes through block 214 to block 216 if the table is to be built on the fly (i.e., the "ad hoc" or "watch" mode) using actual settings from the system controller 164. Alternatively, if none of these modes is selected by the combination of user switches, then control passes to block 218 and the table is dumped through an interface (e.g., an RS-232 interface, optionally implementing the Semiconductor Equipment Communication Standard (SECS) protocol) to an attached computer or other suitable controller.

Figure 8:
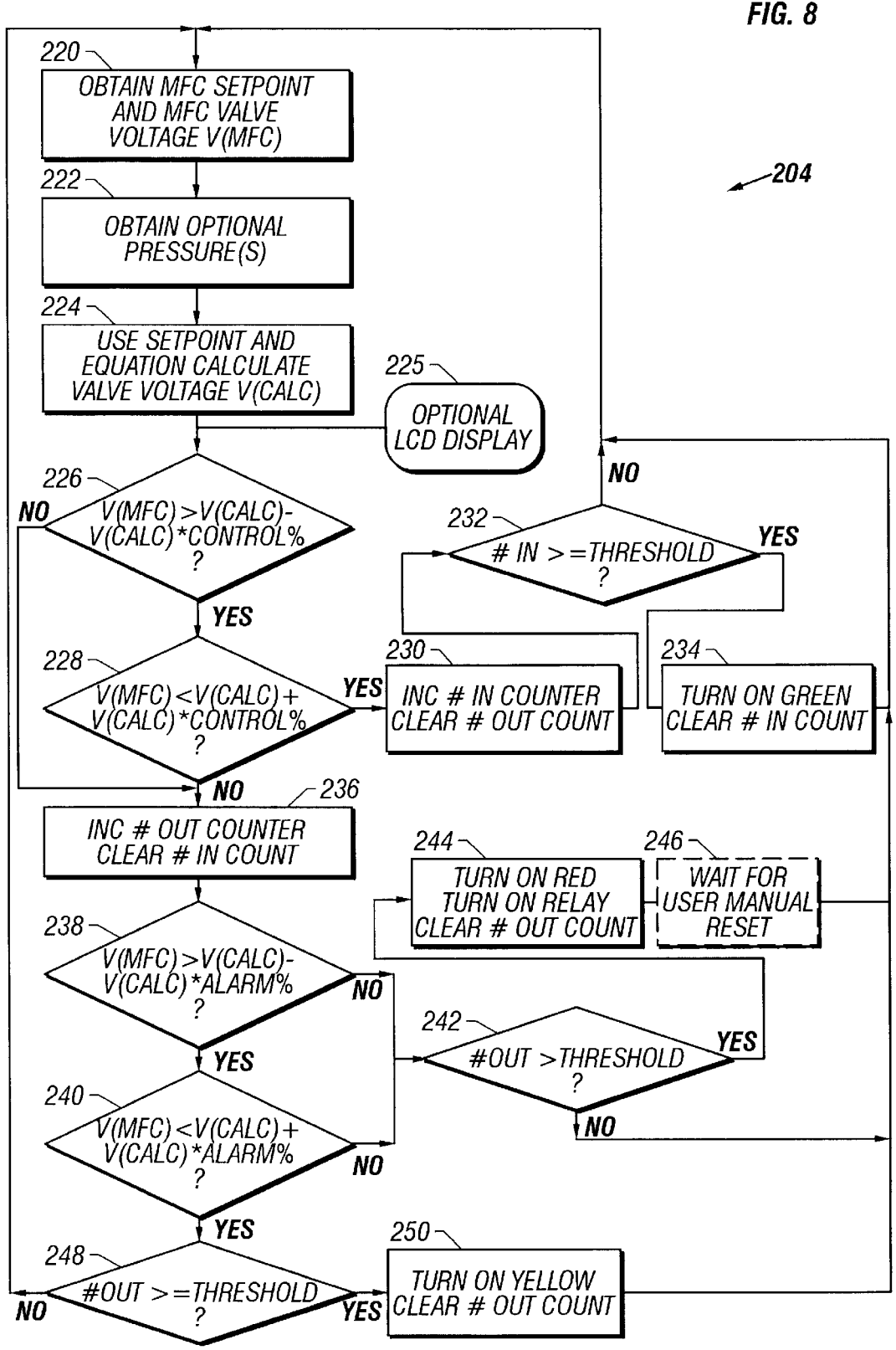
FIG. 8 is a flowchart depicting the operation of the exemplary predictive failure monitoring system when using equation-based data.

The flow details of operation using predefined equations, block 204, is shown in FIG. 8. The MFC setpoint voltage and the actual measured valve voltage "V(mfc)" is obtained at step 220. Optional pressure inputs are obtained at step 222. The nominal valve voltage "V(calc)" is then calculated at step 224 using the MFC setpoint voltage and the stored equation (and possibly using the optional pressure inputs as well). The various parameters may be displayed on the optional LCD display at step 225. Steps 226 and 228 serve to determine whether the measured valve voltage "V(mfc)" falls within the user-selectable CONTROL limits (e.g., within the tolerance window of the nominal calculated valve voltage "V(calc)" plus and minus the "Control %"). If so, control passes to step 230 where the IN counter is incremented and the OUT counter is cleared. If the IN counter is greater than or equal to the threshold value, control passes from step 232 to step 234 where the green light is illuminated, the IN counter is cleared, and control is returned to step 220 to begin another sample. However, if the measured valve voltage falls outside the user-selectable CONTROL limits, control passes to step 236 where the OUT counter is incremented and the IN counter is cleared. Steps 238 and 240 then serve to determine whether the measured valve voltage falls within the user-selectable ALARM limits (the "Alarm %"). If so, control passes to step 248 to test the OUT counter. If the OUT counter is greater than or equal to the threshold value, control passes to step 250 where the yellow light is illuminated, the OUT counter is cleared, and control is returned to step 220 to begin another sample. If the OUT counter is less than the threshold value, control is immediately returned to step 220 to begin another sample. However, if (at steps 238, 240) the measured valve voltage falls outside the user-selectable ALARM limits, control passes to step 242 to test the OUT counter. If the OUT counter is less than the threshold value, control is immediately returned to step 220 to begin another sample. Alternatively, if the OUT counter is greater than or equal to the threshold value, control passes to step 244 where the red light is illuminated, the relay is turned on, the OUT counter is cleared, and control is returned to step 220 to begin another sample. An optional step 246 requires manual clearing of the alarm condition by a user before control is returned to step 220, to ensure that even a brief alarm condition is noted by user intervention.

Figure 9:
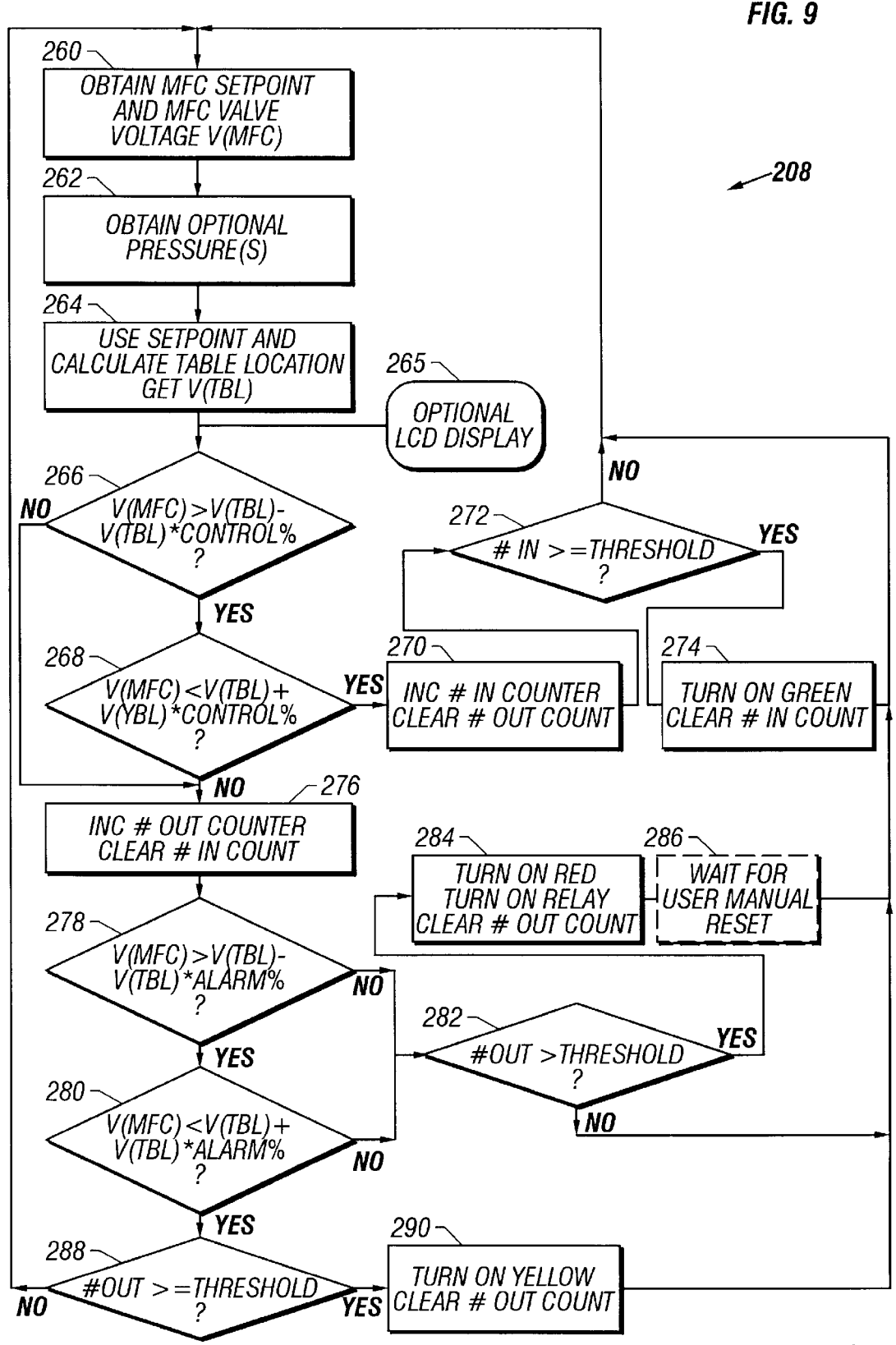
FIG. 9 is a flowchart depicting the operation of the exemplary predictive failure monitoring system when using table-based data.

The flow details of operation using table-based data, block 208, is shown in FIG. 9. The steps 260–290 are generally analogous to respective steps 220–250 in FIG. 8. The MFC setpoint voltage and the actual measured valve voltage "V(mfc)" is obtained at step 260. Optional pressure inputs are obtained at step 262. The nominal valve voltage "V(tbl)" is then determined from the stored table at step 264 using the MFC setpoint voltage to index into the stored table and then adjusted by the optional pressure inputs. The various parameters may be displayed on the optional LCD display at step 265. Steps 266 and 268 serve to determine whether the measured valve voltage "V(mfc)" falls within the user-selectable CONTROL limits (e.g., within the tolerance window of the nominal table-determined valve voltage "V(tbl)" plus and minus the "Control %"). If so, control passes to step 270 where the IN counter is incremented and the OUT counter is cleared. If the IN counter is greater than or equal to the threshold value, control passes from step 272 to step 274 where the green light is illuminated, the IN counter is cleared, and control is returned to step 260 to begin another sample. However, if the measured valve voltage falls outside the user-selectable CONTROL limits, control passes to step 276 where the OUT counter is incremented and the IN counter is cleared. Steps 278 and 280 then serve to determine whether the measured valve voltage falls within the user-selectable ALARM limits (the "Alarm %"). If so, control passes to step 288 to test the OUT counter. If the OUT counter is greater than or equal to the threshold value, control passes to step 290 where the yellow light is illuminated, the OUT counter is cleared, and control is returned to step 260 to begin another sample. If the OUT counter is less than the threshold value, control is immediately returned to step 260 to begin another sample. However, if (at steps 278, 280) the measured valve voltage falls outside the user-selectable ALARM limits, control passes to step 282 to test the OUT counter. If the OUT counter is less than the threshold value, control is immediately returned to step 260 to begin another sample. Alternatively, if the OUT counter is greater than or equal to the threshold value, control passes to step 284 where the red light is illuminated, the relay is turned on, the OUT counter is cleared, and control is returned to step 260 to begin another sample. Optional step 286 requires manual clearing of the alarm condition by a user before control is returned to step 260, as before.

Figure 10:
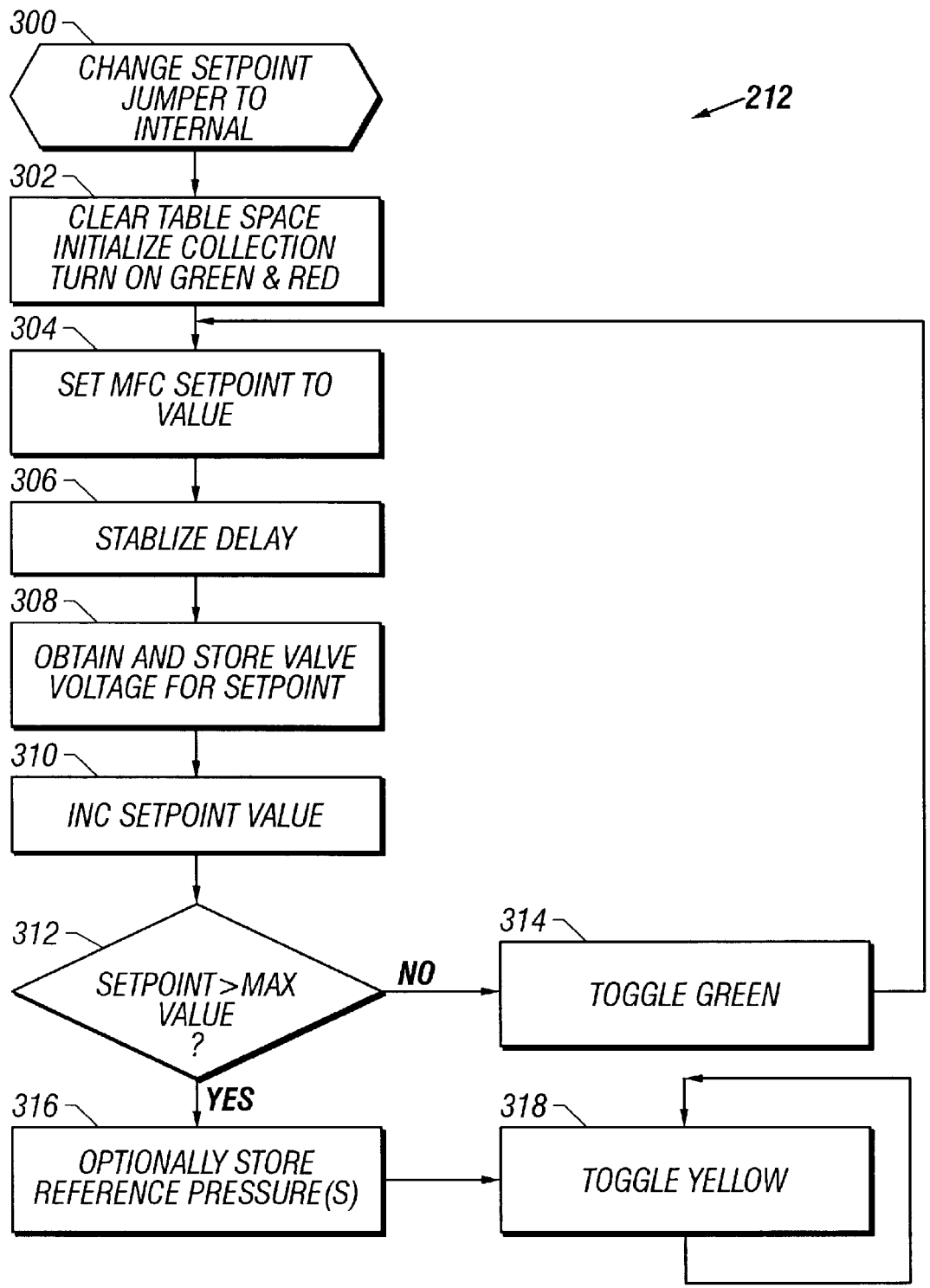
FIG. 10 is a flowchart depicting the operation of the exemplary predictive failure monitoring system to create or build a table.

The flow details of operation to create or build a table, block 212, is shown in FIG. 10. In this mode the monitoring system 160, rather than the system controller 164, temporarily drives the MFC setpoint voltage input across a range of values and reads the corresponding valve voltage generated by the MFC 100. Consequently, at step 300 the MFC setpoint voltage jumper is changed to disconnect the MFC setpoint voltage signal conveyed to MFC card edge connector 108 from the monitor card edge connector 168, and instead connects it to be driven by the monitoring system 160. This may be accomplished, for example, by a jumper or a switch. At step 302 the data table is then cleared, both red and green lights are illuminated to indicate to a user that the monitoring system 160 is currently building a table, and the collection process is initialized. The table may optionally be left unerased at step 302 to allow a partial table to be built. A loop is created by steps 304, 306, 308, 310, 312, and 314 to incrementally drive a range of MFC setpoint voltages to the attached MFC, and to measure and store the resulting valve voltage generated by the MFC corresponding to each MFC setpoint voltage. After incrementing the MFC setpoint voltage at step 310, the value is checked against a MAX value at step 312. If not yet finished, the green light is toggled at step 314 and control returned to step 304 to drive the incremented MFC setpoint voltage to the attached MFC and to measure and store the corresponding valve voltage. When the range of MFC setpoint voltage is exceeded at step 312, control passes to step 316 to optionally measure and store the reference upstream and downstream pressures associated with the measured data table. Then, control passes to step 318 where the yellow light is continuously toggled to indicate the table build is complete, and to alert a user to reset the monitoring system 160.

Figure 11:
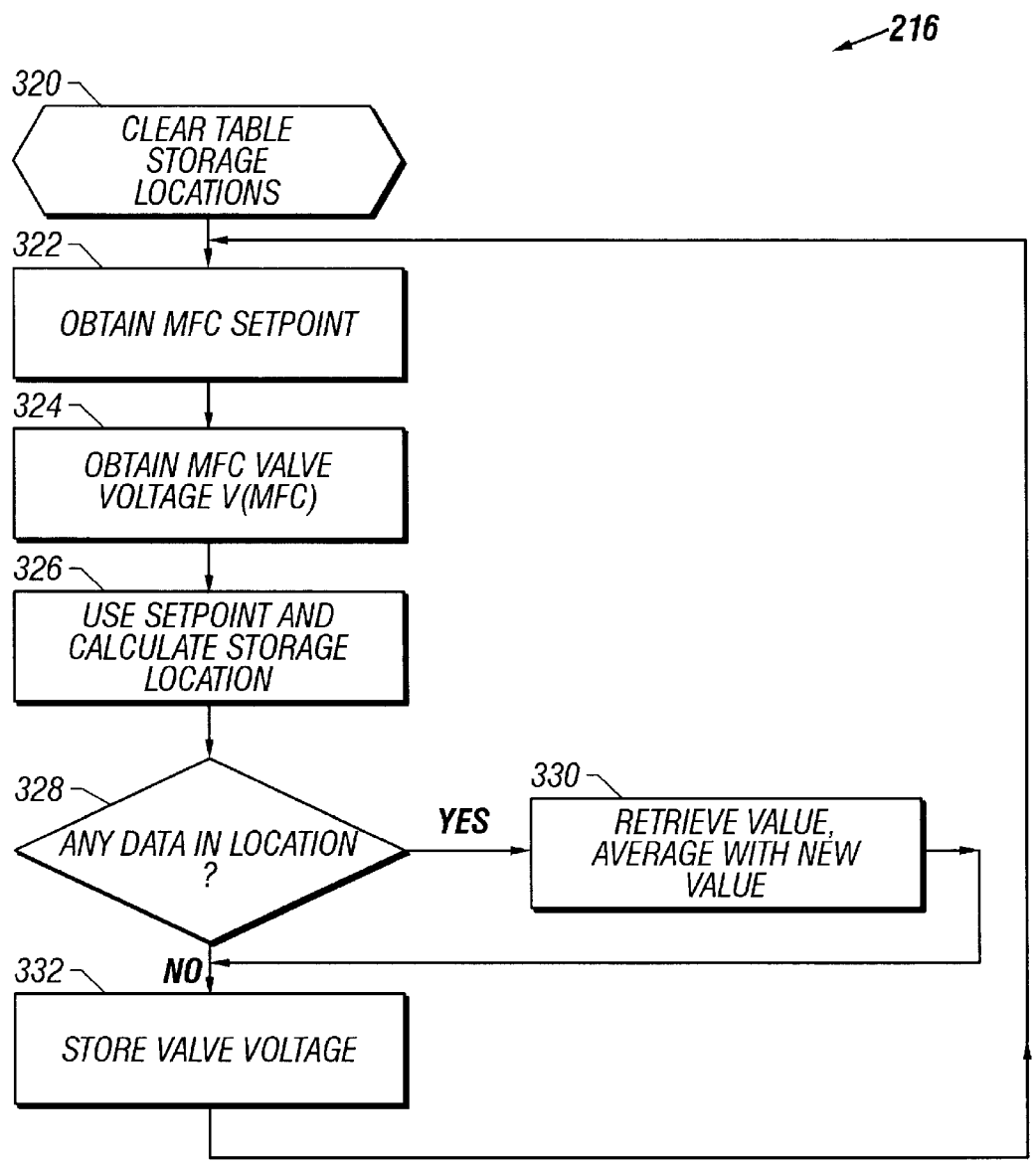
FIG. 11 is a flowchart depicting the operation of the exemplary predictive failure monitoring system to collect data ad hoc (the "watch mode").

The flow details of operation to collect data ad hoc (the "watch mode"), block 216, is shown in FIG. 11. At step 320 the data table is cleared. At step 322 an MFC setpoint voltage is obtained (received from the system controller 164), and a corresponding valve voltage generated in response is measured and obtained at step 324. The obtained MFC setpoint voltage is then used, at step 326, to calculate a storage location and thereby index into the data table. If data is found in the calculated storage location corresponding to the MFC setpoint voltage, the data is retrieved at step 330, averaged with the newly measured valve voltage, and stored back into the respective location at step 332. Alternatively, rather than computing and storing such a "running" average, a weighted average of valve voltages may also be computed by allocating additional storage locations within the internal storage 186 to store the sample size for each measurement along with a weighted average value. Since only valve voltage data is stored which corresponds to actual MFC setpoint voltages provided by system controller 164, if during a subsequent "run" mode, an MFC setpoint voltage is provided to the predictive failure monitoring system 160, no data will be found in the table, and the valve voltage will be considered outside the ALARM limits.

Figure 12:
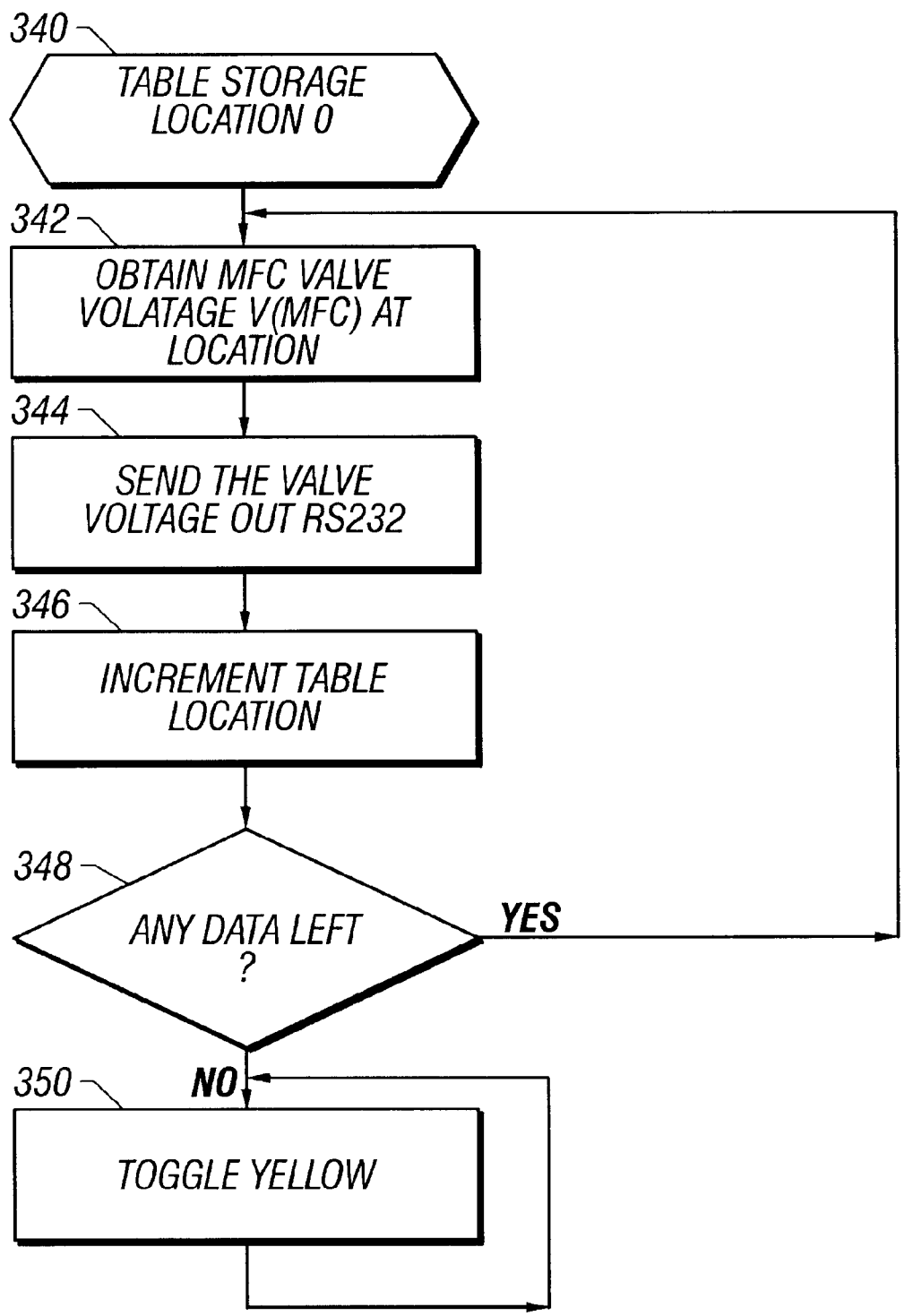
FIG. 12 is a flowchart depicting the operation of the exemplary predictive failure monitoring system to dump the data table.

The flow details of operation to dump the data table, block 218, is shown in FIG. 12. At step 340 a location pointer is cleared. A loop is created by steps 342, 344, 346, and 348 to obtain the MFC valve voltage "V(mfc)" from the data table corresponding to the location pointer, to send the valve voltage data out an RS-232 port, and to increment the location pointer. If any locations remain, control branches from step 348 back to step 342. If no locations remain, control passes to step 350 where the yellow light is continuously toggled to indicate the table dump is complete, and to alert a user to reset the monitoring system 160. Using such an operational flow, a table which has been previously collected or established by any of these methods may be dumped (i.e., downloaded to a system controller).

Figure 13:
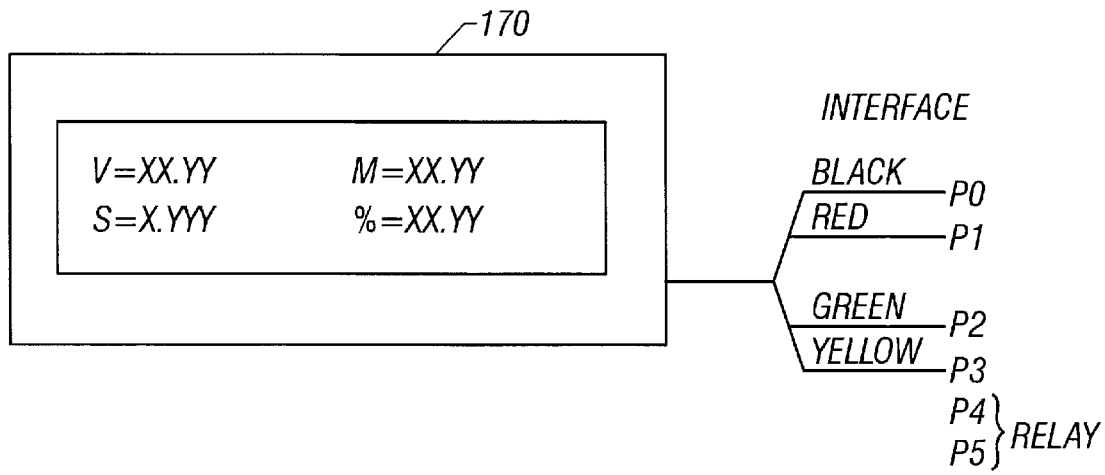
FIG. 13 is a diagram depicting the operation of an optional LCD display which may be attached to the exemplary predictive failure monitoring system.

Referring now to FIG. 13, an optional LCD display 170 may be used to display various operational parameters of an attached MFC. The LCD display which is available as part number BPK-216N from the Scott Edwards Electronics Company may be used. The LCD display 170 may be connected to the predictive failure monitoring system 160 through a terminal connector on the side of the board.

The LCD display 170 shows four parameters relevant to the operation of the MFC and PFMS, as shown in FIG. 13. The "V=xx.yy" displays the absolute value of the current measured valve voltage as generated by the attached MFC (or by an attached diagnostic test box). While the valve voltage is usually a negative number, the negative sign is dropped for display purposes. The "M=xx.yy" displays the absolute value of the model (i.e., nominal expected) valve voltage. The source of the model valve voltage depends upon the operating mode. For equation-based operation, the model valve voltage is calculated from the equation using the MFC setpoint voltage, and optionally adjusted by including compensation for pressure. For table-based operation, the model valve voltage is looked up from the stored data using the MFC setpoint voltage as an index into the data table. The "S=x.yyy" displays the current MFC setpoint voltage as monitored by the monitoring system 160, with 0 corresponding to no gas flow, and 5,000 volts corresponding to full scale flow of the MFC. The "%=xx.yy" displays the error percentage of the current valve voltage compared to the model valve voltage, according to the equation:

$$\%=100*(valve-model)/model.$$

In the table build mode (block 212) and the "ad hoc" mode (block 216), the LCD display 170 shows the instantaneous MFC setpoint voltage and the corresponding measured valve voltage.

Figure 14A:
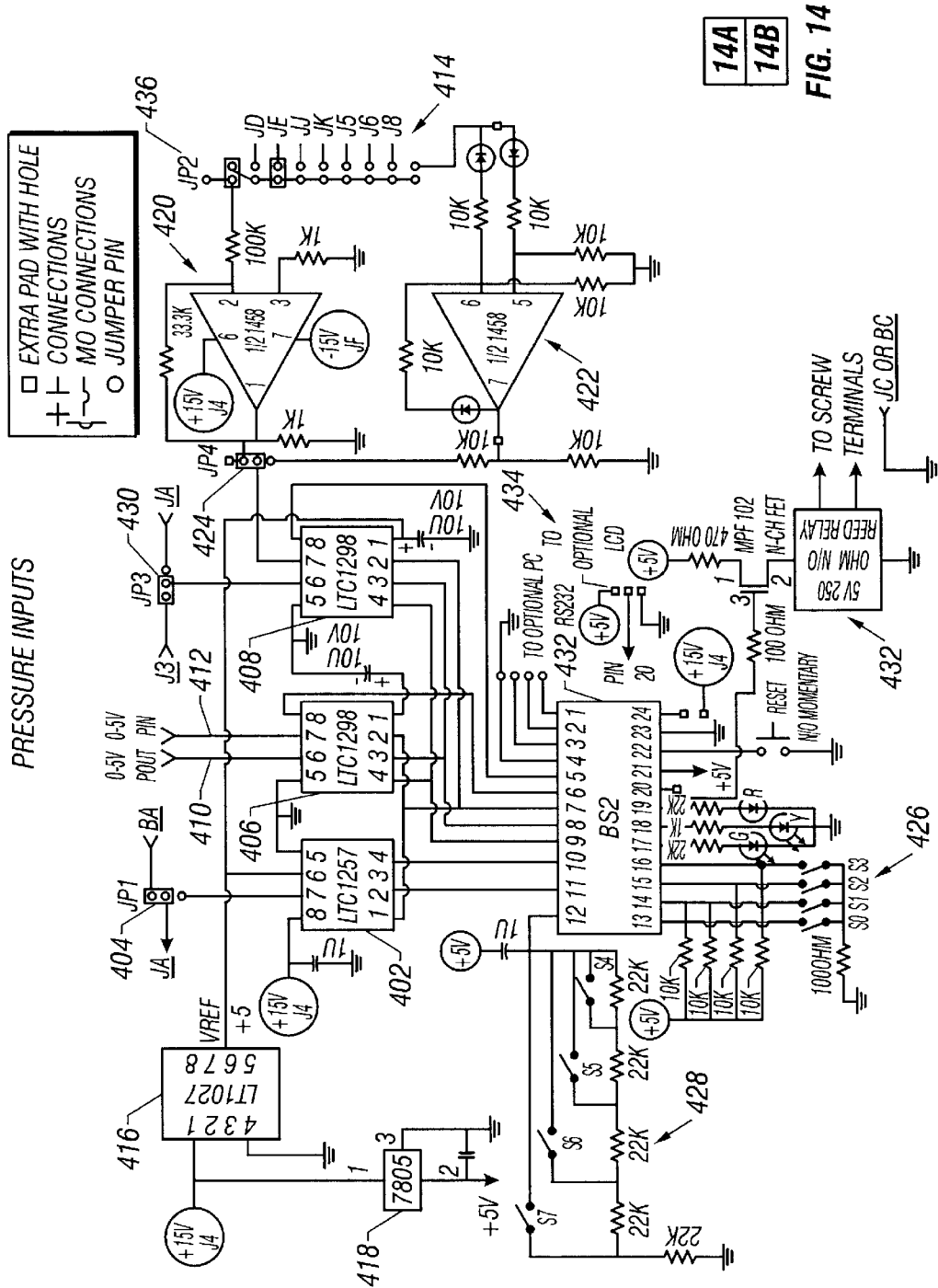
FIG. 14 is an electrical schematic diagram of an implementation of the exemplary predictive failure monitoring system.
Figure 14B:
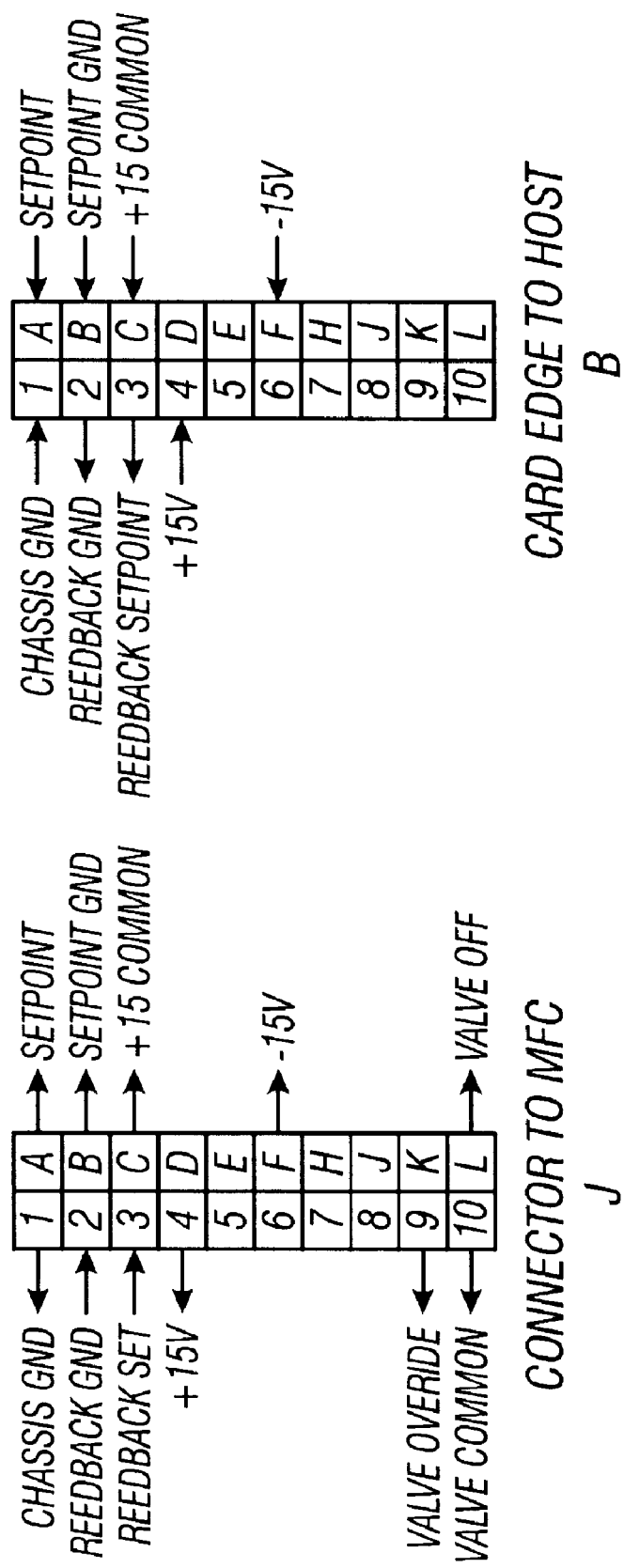

An electrical schematic diagram of the exemplary predictive failure monitoring system 160 is shown in FIG. 14. The LTC1257 device (shown as element 402) is a digital-to-analog converter (D/A) used for controlling the MFC setpoint during the in-situ characterization. Jumper JP1 (shown as element 404) intercepts this signal which normally is passed directly from the system controller (received on terminal BA) to the MFC on terminal JA. When jumper JP1 is in the alternate position, the D/A 402 provides the setpoint to the MFC so that the table can be built sequentially for "in situ" characterization of the MFC.

Two LTC1298 devices (shown as elements 406 and 408) are analog-to-digital (A/D) converters for the Setpoint, Valve Voltage, and Pressure inputs. A/D 406 digitizes the optional pressure inputs received on terminals 410, 412. A/D 408 digitizes the valve voltage received from the MFC on one of terminals 414. Since both the A/D and D/A functions need to be done with high accuracy (e.g., in the 1.2 millivolt step size), the LTC1027 device (indicated as element 416) is a precision reference voltage generator which supplies a high accuracy 5.00 volt reference voltage for both the A/D devices 406, 408 and the D/A device 402. The 7805 voltage regulator (shown as element 418) provides a 5.0 volt supply to the various circuits in the PFMS 160.

Two different signal conditioning circuits 420, 422 are provided to convert the valve voltage signal into a 0 to +5 volt signal for the A/D converter 408. The most common valve voltage signal is a 0 to −15 volt signal. The signal conditioning circuit 420 is designed to convert such a 0 to −15 volt signal into 0 to +5 volt signal for the A/D converter 408. Since other valve voltage signal ranges are also encountered in commercial products, the signal conditioning circuit 422 is designed to accept either a 0 to +5 volt input signal or a 0 to −5 volt input signal, and output a 0 to about +5 volt signal. These circuits 420, 422 may be easily modified to provide any other conversion needed since the bipolar to positive conversion is component heavy, there is easily some flexibility in the printed circuit board such that a number of different circuit configurations may be provided. In other words, the signal conditioning circuit 422 can be configured, by changing components and using jumpers, for converting basically any valve voltage range into a 0 to +5 volt signal without having to modify the basic circuit board layout and design. This provides a cost effective and flexible printed wiring board. Jumper JP2 (shown as element 436) is configured to select which terminal position the valve voltage is received on, and to convey the valve voltage to a selected one of the two signal conditioning circuits 420, 422. Jumper JP4 (shown as element 424) is configured to select the output of one of the two signal conditioning circuits 420, 422, and convey it to the A/D converter 408. Jumper JP3 (shown as element 430) is used to select the source of the setpoint signal to the PFMS. The setpoint signal source may be configured to be the input signal from the system controller 164 to the MFC, or the setpoint signal source may be configured to be the feedback signal from the MFC itself.

Switches S0–S3 and their respective resistors together form a first resistor/switch network 426 which is used to select the operating tolerance as illustrated in Table 1 and Table 2 above. Switches S4–S7 and their respective resistors together form a second resistor/switch network 428 which is used to select the operating mode, as illustrated in FIG. 7. Alarm circuit 432 provides the relay output which provides for configuring a series alarm loop. Terminals 434 provide the connection path the optional LCD display 170.

Figure 15B:
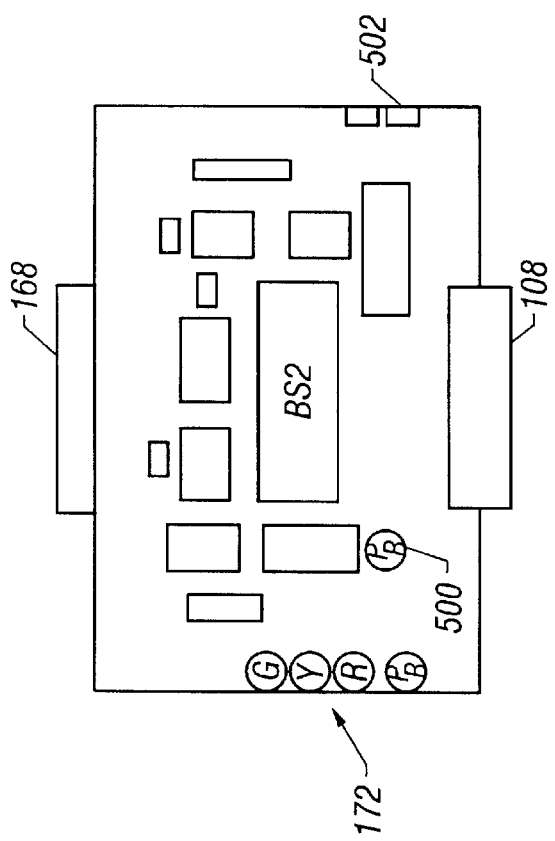
FIGS. 15A and 15B are electrical component placement diagrams showing two implementations of the electrical schematic shown in FIG. 14.
Figure 15A:
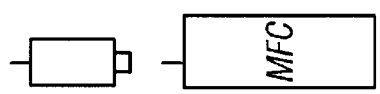
Figure 15A:
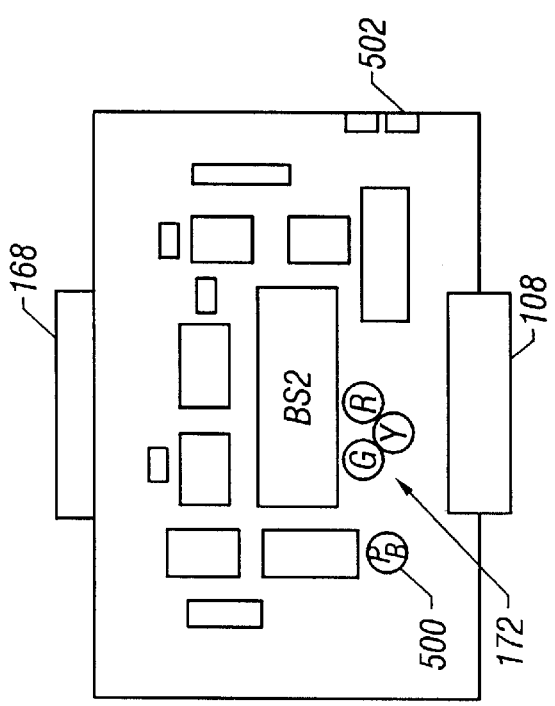

FIGS. 15A and 15B each show the placement of the various components on the printed wiring board 126 of the predictive failure monitoring system 160, including a reset pushbutton 500 and two possible locations for the status lights 172. The side connector 502 is also shown for attaching the optional LCD display 170 and pressure inputs 176.

While the invention has been described with respect to the embodiments set forth above, the invention is not necessarily limited to these embodiments. For example, any of a wide variety of data collection interfaces may be employed in addition to or instead of the LCD described, such as ethernet, sensorbus, or SECS-II (which uses RS-232 cabling, but an industry agreed-upon signaling protocol). Moreover, control of the predictive failure monitoring system 160 may be initiated not by local switches manipulated by a user, but by way of commands received from a suitable computer or control interface. While the accuracy of the MFC monitoring is more accurate by using the optional gas pressure transducers, their use is not mandatory. Variations in design or configuration details, and in the operational flowcharts are contemplated by one skilled in the art using the teachings of this disclosure.

In addition, the teachings of this invention are limited to application only to mass flow controllers, but may be advantageously utilized in other feedback controller situations. Accordingly, other embodiments, variations, and improvements not described herein are not necessarily excluded from the scope of the invention, which is defined by the following claims.

What is claimed is:

1. An apparatus for monitoring operation of a mass flow controller (MFC) comprising:

a first interface circuit having a first input for receiving a particular setpoint signal conveyed to the MFC by a control system operably connected to the MFC, and for generating, on a first output of the first interface circuit, a first signal corresponding to the particular setpoint signal, said first interface circuit having a second input for receiving an actual valve control signal generated by the MFC in response to the particular setpoint signal, and generating, on a second output of the first interface circuit, a second signal corresponding to the actual valve control signal;

a storage circuit for providing an expected valve control signal corresponding to the particular setpoint signal received by the MFC;

a comparison circuit for comparing the second signal to the first signal to determine whether the actual valve control signal received from the MFC falls within a predetermined range of expected valve control signals corresponding to the particular setpoint signal conveyed to the MFC; and a status interface for conveying information related to whether the actual valve control signal received from the MFC is determined to fall within the predetermined range.

2. An apparatus as in claim 1 wherein:

the status interface comprises a first indicator which is activated when the actual valve control signal falls outside a first acceptable range of expected valve control signals for more than a first predetermined number of comparisons.

3. An apparatus as in claim 2 wherein:

the status interface comprises a second indicator which is activated when the actual valve control signal falls outside a second acceptable range of expected valve control signals for more than a second predetermined number of comparisons.

4. An apparatus as in claim 1 wherein:
the status interface comprises a switch closure output terminal pair.

5. An apparatus as in claim 2 wherein:
the first indicator comprises at least one user viewable status light.

6. An apparatus as in claim 2 wherein:
the second indicator comprises at least one user viewable status light.

7. An apparatus as in claim 1 wherein:
the storage circuit comprises a lookup table for storing an expected value of the valve control signal as a function of the setpoint signal received by the MFC.

8. An apparatus as in claim 1 wherein:
the storage circuit includes an equation storage circuit, for calculating an expected value of the valve control signal as a function of the setpoint signal received by the MFC.

9. An apparatus as in claim 1 further comprising:
a user selection interface for specifying the predetermined range of expected valve control signals corresponding to the particular setpoint signal conveyed to the MFC.

10. An apparatus as in claim 1 which is self contained and insertable in-line between an MFC and a system controller.

11. An apparatus as in claim 10 wherein the apparatus is operably powered by the system controller.

12. An apparatus as in claim 10 which is operably transparent to the system controller.

13. An apparatus as in claim 1 further comprising:
a second interface circuit having a first input for receiving a first pressure signal from a sensor upstream of the MFC, and for generating, on a first output of the second interface circuit, a first signal corresponding to the first pressure signal, said second interface circuit having a second input for receiving a second pressure signal from a sensor downstream of the MFC, and generating, on a second output of the second interface circuit, a second signal corresponding to the second pressure signal.

14. An apparatus as in claim 1 wherein:
the status interface circuit includes a port for connecting to a textual display device for displaying user readable status information descriptive of operational status of the MFC.

15. An apparatus as in claim 1 wherein:
the storage circuit is a portion of a larger circuit which includes a controller circuit for orchestrating operation of the apparatus.

16. An apparatus for monitoring operation of a mass flow controller (MFC) comprising:
means for comparing, in response to a particular setpoint value received by the MFC from a control system, an actual valve control value generated by the MFC against a first acceptable range of expected valve control values corresponding to the particular setpoint value received by the MFC;
means for generating a first status indication when the actual valve control value falls outside the first acceptable range of expected valve control values for more than a first predetermined number of comparisons.

17. An apparatus as recited in claim 16 further comprising:
means for storing a plurality of data pairs each providing an MFC setpoint value and a corresponding expected valve control value.

18. An apparatus as recited in claim 16 further comprising:
means for storing an equation from which, for each possible MFC setpoint value, a corresponding expected valve control value may be computed.

19. An apparatus as recited in claim 16 further comprising:
means for retrieving from a host when connected thereto, a plurality of potential setpoint values which may be received by the MFC and an acceptable range of expected valve control values corresponding to each potential setpoint value.

20. An apparatus as recited in claim 16 further comprising:
means for generating a second status indication when the actual valve control value falls outside a second acceptable range of expected valve control values for more than a second predetermined number of comparisons.

21. A method for monitoring operation within a mass flow controller (MFC) comprising:
comparing, in response to a particular setpoint value received by the MFC from a control system, an actual valve control value generated by the MFC against an acceptable range of expected valve control values corresponding to the particular setpoint value received by the MFC;
generating an alarm condition when the actual valve control value falls outside the acceptable range of expected valve control values for more than a threshold number of comparisons.

22. A method for monitoring operation within a mass flow controller (MFC) comprising:
comparing, in response to a particular setpoint value received by the MFC from a control system, an actual valve control value generated by the MFC against a first acceptable range of expected valve control values corresponding to the particular setpoint value received by the MFC;
generating a first status indication when the actual valve control value falls outside the first acceptable range of expected valve control values for more than a first predetermined number of comparisons.

23. A method as recited in claim 22 further comprising:
storing a plurality of data pairs each providing an MFC setpoint value and a corresponding expected valve control value.

24. A method as recited in claim 22 further comprising:
storing an equation from which, for each possible MFC setpoint value, a corresponding expected valve control value may be computed.

25. A method as recited in claim 22 further comprising:
retrieving from a host when connected thereto, a plurality of potential setpoint values which may be received by the MFC and an acceptable range of expected valve control values corresponding to each potential setpoint value.

26. A method as recited in claim 22 further comprising:
generating a second status indication when the actual valve control value falls outside a second acceptable range of expected valve control values for more than a second predetermined number of comparisons.

* * * * *